United States Patent [19]
Tsujimoto

[11] Patent Number: 6,006,072
[45] Date of Patent: Dec. 21, 1999

[54] METHOD AND APPARATUS FOR INTERFERENCE CANCELLATION

[75] Inventor: Ichiro Tsujimoto, Tokyo, Japan

[73] Assignee: NEC Corporation, Tokyo, Japan

[21] Appl. No.: 09/050,097

[22] Filed: Mar. 30, 1998

[30] Foreign Application Priority Data

Mar. 28, 1997 [JP] Japan .................................. 9-092748

[51] Int. Cl.$^6$ ................................................ H04Q 7/20
[52] U.S. Cl. ............................... 455/63; 455/65; 455/69; 455/67.5
[58] Field of Search ................................ 455/69, 68, 63, 455/65, 67.5, 296, 277.1, 277.2, 276.1, 278.1, 304; 342/17, 18, 19, 159, 378, 379

[56] References Cited

U.S. PATENT DOCUMENTS

| | | | |
|---|---|---|---|
| 4,969,211 | 11/1990 | Raymond | 455/277.1 |
| 5,379,046 | 1/1995 | Tsujimoto | 455/65 |
| 5,392,459 | 2/1995 | Baba et al. | 455/69 |
| 5,630,223 | 5/1997 | Babu et al. | 455/296 |
| 5,768,698 | 6/1998 | Kinoshita | 455/273 |

OTHER PUBLICATIONS

R.R. Compton, Jr., "The Power–Inversion Adaptive Array: Concept and Performance", *IEEE Transactions on Aerospace and Electronic Systems*, vol. AES–15, No. 6, Nov. 1979, pp. 803–814.

J.R. Treichler et al., "A New Approach to Multipath Correction of Constant Modulus Signals", *IEEE Transactions on Acoustics, Speech, and Signal Processing*, vol. ASSP–31, No. 2, Apr. 1983, pp. 459–472.

*Primary Examiner*—Wellington Chin
*Assistant Examiner*—Yemane Woldetatios
*Attorney, Agent, or Firm*—Young & Thompson

[57] ABSTRACT

In first radio station and a second radio station constituting a radio transmission system using spatial duplex diversity, interference signals are cancelled by a power inversion adaptive array (PIAA). One branch of the transmission side is multiplied by a complex coefficient multiplier so that the desired received signal has the optimum vector value after a combination of two branches and PIAA processing. An envelope detector detects the received signal level with an envelope detector at the receiving side, feeds back the received signal level information to the transmission side through the transmission baseband circuit, extracts the information with the receiving baseband circuit at the transmission side, and inputs the information into a constant modulus algorithm control circuit. The constant envelope algorithm control circuit sequentially controls the complex coefficient multiplier so that the multiplier has an optimum value.

10 Claims, 9 Drawing Sheets

METHOD AND APPARATUS FOR INTERFERENCE CANCELLATION

BACKGROUND OF THE INVENTION

1. Field of the Invention

The present invention relates to an interference canceler, and, more particularly, to a method and apparatus for cancelling interference signals by using a power inversion adaptive array (hereinafter called the "PIAA").

2. Description of the Related Art

A diversity receiver is used typically in order to compensate for effects of multipath-fading phenomena in a long hop microwave communication. FIG. 7 shows a general block diagram of conventional microwave communication systems with dual type space diversity. In FIG. 7, the left side is defined to be a first radio station, and the right side is defined to be a second radio station.

In the first radio station, 201 is a transmitting baseband circuit (TX BB) for processing baseband signal TX DATA. 202 is a digital modulator (MOD) for modulating an output of the TX BB 201. 203 and 204 are two transmitters (TX) for transmitting the modulated signal. 205 and 206 are two antennae for transmitting outputs of the transmitters 203 and 204 to the second radio station. 207 and 208 are two receivers (RX) for receiving transmitted signals from the second radio station. 209 is a PIAA circuit for cancelling interferences. 210 is a digital demodulator (DEM) for demodulating the modulated signal. 211 is a decision unit (DEC) for recovering TX DATA. 212 is a receiving baseband circuit (RX BB) for processing the recovered data.

As the second radio station has the same configuration as the first radio station, explanation of the second radio station is omitted.

Transmitted data signal (TX DATA) of the first radio station is added with overhead signals such as a frame synchronization signal by the transmitting baseband circuit 201, and subjected to time division multiplex (TDM) and speed conversion. Output of the transmitting baseband 201 is modulated by the modulator 202, i.e., frequency modulated from an intermediate frequency (IF) band to a radio frequency (RF) band, and power amplified, branched into two signals, and input into the transmitters 203 and 204. Outputs of the transmitters 203 and 204, S, are supplied to the antennae 205 and 206. The first radio station is assumed to transmit the RF signal in vertical polarization (VP). The RF signal transmitted from the first radio station is spatially spread and propagated in a radiation pattern of the antenna.

It is assumed that (i) a propagation constant (a complex number): from the antenna 205 of the first radio station to the antenna 225 of the second radio station is h11, (ii) a propagation constant from the antenna 205 of the first radio station to the antenna 226 of the second radio station is h12, (iii) a propagation constant from the antenna 206 of the first radio station to the antenna 225 of the second radio station is h21, and (iv) a propagation constant (complex number) from a antenna 206 to the antenna 226 of the second radio station is h22.

In general, microwave communication has a problem that various interference signals degrade quality in a communication link, or makes it impossible to perform communication. Examples of such interference signals include interference from an adjacent channel, radar interference, or a disturbing signal.

In FIG. 7, 240 designates an interference signal source J, which is assumed to be received by the antennae 225 and 226 of the second radio station. It is assumed that a propagation constant (a complex number) from the interference signal source J to the antenna 225 is J1, and a propagation constant from the interference signal source J to antenna 226 is J2. Since the plane of transmission polarization at the first radio station is vertical polarization (VP), the plane of receiving polarization at the second radio station uses the same vertical polarization.

In the second radio station, received signals from the antennae 225 and 226 are input into the receivers 227 and 228, respectively, and subjected to processing for low noise amplification and frequency conversion from the RF band to the IF band. If received signals output from the receivers 227 and 228 are r1 and r2, they can be expressed as follows:

$$r1 = h11 \cdot S + h21 \cdot S + J1 \cdot J \quad (1)$$

$$r2 = h12 \cdot S + h22 \cdot S + J2 \cdot J \quad (2)$$

where S indicates a transmitted signal, and is a desired signal at the receiver side.

The two-branch received signal is linearly combined by the PIAA circuit 229. The PIAA circuit 229 uses a technique conventionally implemented to cancel interference signals.

Output y of the PIAA circuit 229 is expressed as follows:

$$y = W1 \cdot r1 - W2 \cdot r2 \quad (3)$$

When equations (1) and (2) are substituted for equation (3), the following is obtained:

$$y = \{W1(h11+h21) - W2(h12+h22)\} \cdot S + (W1 \cdot J1 - W2 \cdot J2) \cdot J \quad (4)$$

Here, the requirement for the interference component J to be canceled is:

$$W1 \cdot J1 - W2 \cdot J2 = 0 \quad (5)$$

The PIAA circuit 229 finds the following as a solution of (5):

$$W1 = 1/J1 \quad (6)$$

$$W2 = 1/J2 \quad (7)$$

and performs linear combination to cancel unnecessary interference signals.

The PIAA circuit shows diversity combination of two branches. Another prior art system, a general system using an N-element antenna array is published by Compton in "The Power Inversion Adaptive Array: Concept and Performance", IEEE Transaction on Aerospace and Electronics Systems, Vol. AES 15, No. 6, November 1979.

In a PIAA, it is difficult to find weight coefficients W1 and W2. The Compton system finds the weight coefficient from correlation between an error signal, between an array combiners output and a reference signal, and each branch received signal. However, there is no detailed description on the reference signal. Thus, when it is intended to be implemented as a device, there arises a problem as to what is employed as the reference signal.

FIG. 8 shows an example of a conventional interference canceler in which the PIAA is applied to a diversity receiver.

301 and 302 are automatic gain control amplifiers (AGC) in each branch. 303 and 304 are complex multipliers for multiplying a weight coefficient by the outputs of the AGC amplifiers 301 and 302. 305 and 306 are correlaters (CORR) for obtaining the weight coefficients W1 and W2 of respective branches. 307 is a subtractor, 308 is an adder, 309 is an AGC amplifier (AGC), and 310 is a switch (SW).

In FIG. 8, diversity combination is performed by the adder 308, and its combiner system is a maximum ratio combiner. That is, first, level fluctuation of flat fading is removed by the AGC amplifiers 301 and 302 at each diversity input. Then, the multipliers 303 and 304 multiply the complex weight coefficients W1 and W2 so that the maximum ratio combination is performed by the adder 308. These weight coefficients are found by the correlaters 305 and 306 from correlation between the output of the AGC amplifier 309 after diversity combination and the outputs of AGC amplifiers 301 and 302.

If there exists no interference signal, the switch 310 selects and outputs the output of the AGC amplifier 309. If there is strong interference signals that makes the D/U ratio (ratio of desired signal to the undesired interference signal) negative, the switch 310 selects and outputs the output of the subtractor 307. The subtractor 307 subtracts the output of the complex multiplier 304 from the output of the complex multiplier 303, and cancels the interference signal through inverse-phase combiner on phase, while the adder 308 performs in-phase combiner on phase.

The operation of the conventional interference canceler is described with reference to FIG. 9A–9L. FIG. 9A and 9D show inputs (Input 1 and Input 2) of the diversity branches 1 and 2, respectively. Here, it is assumed that S1 and S2 are desired signals of each branch, and their interference signals are J1 and J2. If the interference signal is so strong as to makes D/U negative, the interference signal is normalized by the AGC amplifiers 301 and 302.

While, in the initial state, phases of interference signal vectors of the multipliers 303 and 304 are not in-phase, and most output components at the adder 308 are interference signals. When normalized by the AGC amplifier 309, and correlated with outputs of the AGC amplifiers 301 and 302, phase information of the interference signal vector of each branch can be obtained in a complex conjugate form as reference of an interference signal at the output of the AGC amplifier 309, as weight coefficients W1 and W2 of each branch. Multiplication of them in each branch can control the interference signal vectors in-phase to the phase of the normalized interference vector of the output of the AGC amplifier 309.

That is, the adder 308 can combine the interference signals in-phase to each other. Thereby, as shown in FIGS. 9B and 9E, amplitudes and phases of the interference signal outputs J1 and J2 at the multipliers 303 and 304 are controlled to be equal respectively. FIG. 9C shows in-phase combination of the interference signals J1 and J2 at the output of the adder 308. As shown in FIG. 9F, since the interference signals J1 and J2 are cancelled and eliminate each other at the output of the subtractor 307, only the desired signal is extracted.

The PIAA output, having cancelled the interference signals is input into the demodulator 230, and then demodulated. The demodulated signal is in a state that an eye pattern is bandwidth-limited. The demodulated signal is determined by the decision unit 231 and recovered as a digital signal. The recovered digital signal is input into the receiving baseband circuit (RX BB) 232, where it is subject to frame synchronization or the like, so that signals such as an order wire signal are separated and extracted.

The above description is for transmission of a signal from the first radio station to the second radio station. Alternatively, a signal may be transmitted in the same manner from the second radio station to the first radio station. However, in this case, horizontal polarization (HP) is employed for the plane of polarization for a radio signal transmitted from the second radio station to the first radio station.

When the interference signal is cancelled for the PIAA circuit in the prior art described above, the desired signal may be also lost depending on the phase relationship of the desired signal input into each array branch of the PIAA circuit.

That is, if the desired signal S and the interference signal J are in the same amplitude and phase relationship for the inputs 1 and 2 as in FIG. 9G and 9J, the outputs of the multipliers 303 and 304 agree with each other as in FIG. 9H and 9K. At that moment, the output of the adder 308 is in-phase combined for the desired signal S and the interference signal J as in FIG. 9I. On the other hand, the output of the subtractor 307 is inverse-phase combined for both the desired signal S and the interference signal J in FIG. 9L. Accordingly, the output of the subtractor 307 is cancelled for the interference signal, but the desired signal is also cancelled. This corresponds to a case where the coefficient for the desired signal S is zero in the first term in the right side of equation (4). That is, if $$W1(h11+h21)=(h12+h22) \quad (8)$$

the desired signal disappears.

SUMMARY OF THE INVENTION

In view of the above problems, the present invention is intended to provide an interference canceler which prevents a received desired signal from disappearing when an interference signal is cancelled, cancels strong wide bandwidth interference signals, and allows optimum combinations for the desired signal.

The interference canceler is comprised of transmitter means for branching a modulated signal modulated by transmitted data into two, and transmitting the branched signals to a destination station through transmitters and antennae in two systems, receiving means for receiving a signal from the destination station through antennae and receivers in two systems, means for cancelling an interference signal from the received signals of the two systems through a PIAA circuit, means for multiplying a complex coefficient on one of the two branched modulated waves, means for envelope detecting the output of the PIAA circuit to find received signal level information, means for feeding back the found received signal level information to the destination station, means for detecting the received signal level information fed back from the destination station, and means for controlling the value of the complex coefficient multiplied on one of the two-branched modulated signals based on the detected received signal level information so that the received signal level at the destination station takes the optimum value by using a constant modulus algorithm.

DETAILED DESCRIPTION OF PREFERRED EMBODIMENTS OF THE INVENTION

Figure 1:
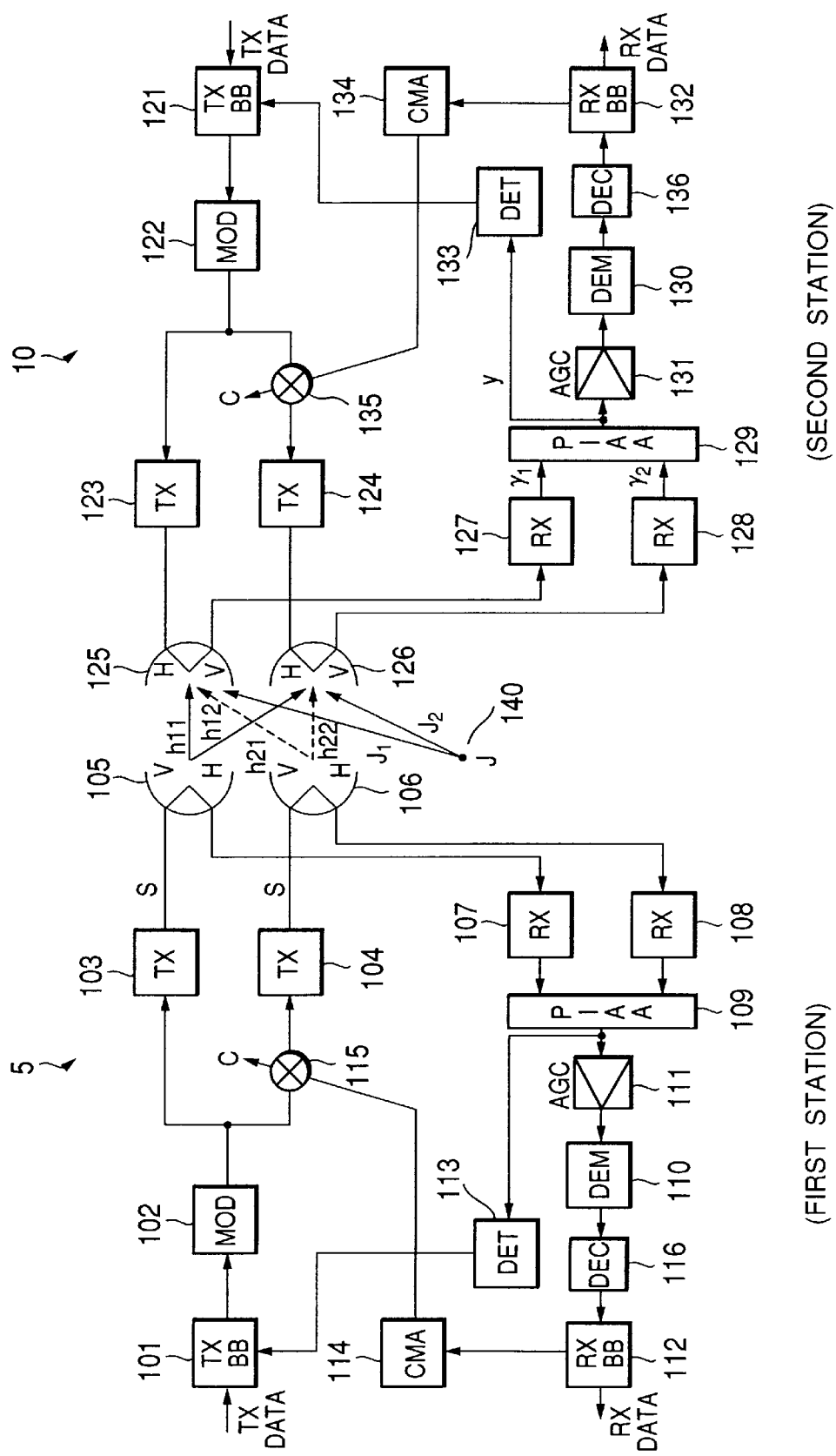
FIG. 1 is block diagram showing an embodiment of the present invention.

In FIG. 1, the left side is defined to be first radio station 5, and the right side is defined to be second radio station 10.

In the first radio station 5, 101 is a transmitting baseband circuit (TX BB) for processing baseband signal of TX data and multiplying data from envelope detector 113. 102 is a digital modulator (MOD) for modulating output of the TX BB 101. 103 and 104 are two transmitters (TX) for transmitting a modulated signal. 105 and 106 are two antennae for transmitting outputs of the transmitters 103 and 104 to the second radio station 10. 107 and 108 are two receivers (RX) for receiving transmitting signals from the second radio station. 109 is a PIAA circuit for cancelling interferences. 110 is a digital demodulator (DEM) for demodulating the modulated signal. 111 is a automatic gain control amplifier (AGC) for amplifying an output of the PIAA 109. 112 is a receiving baseband circuit (RX BB) for processing a recovered data. 113 is an envelope detector (DET) for detecting the output of the PIAA 109. 114 is a constant modulus algorithm control circuit (CMA) for controlling coefficient C based on the constant modulus algorithm. 115 is a complex multiplier for multiplying an output of the modulator 102 by an output of the CMA 114. 116 is a decision unit (DEC) for recovering the TX DATA.

Since the second radio station has the same configuration as the first radio station, explanation about the second radio station is omitted.

Figure 7:
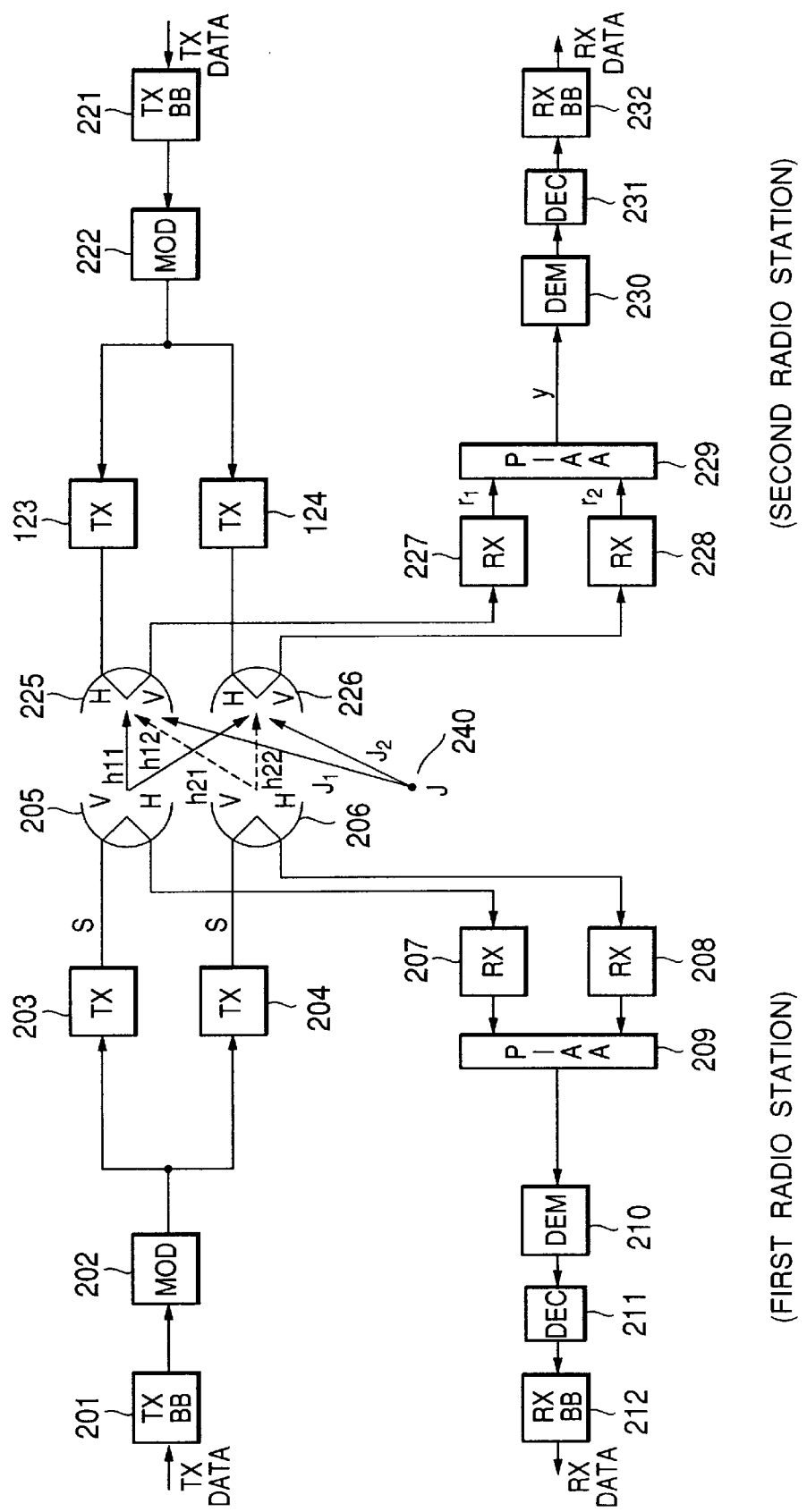
FIG. 7 is a block diagram of the conventional microwave communication systems.
Figure 8:
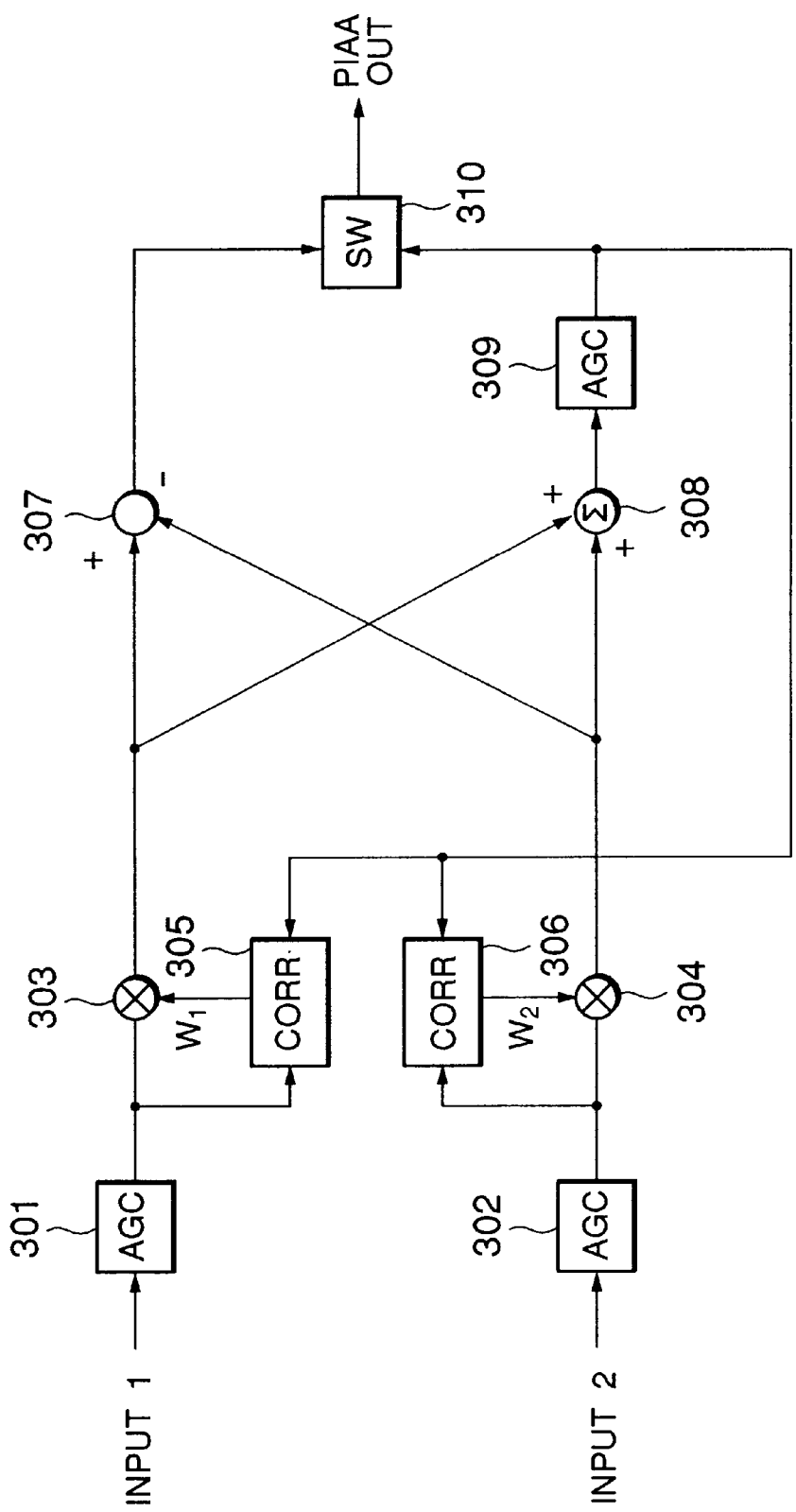
FIG. 8 is block diagram of a convention power inversion adaptive array (PIAA) circuit.
Figures 9A, 9B, 9C:
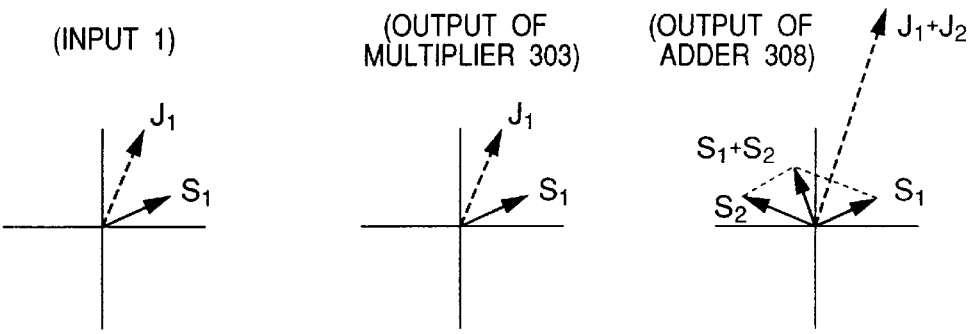
FIG. 9 is graphs illustrating the operation of a convention power inversion adaptive array (PIAA) circuit.
Figures 9D, 9E, 9F:
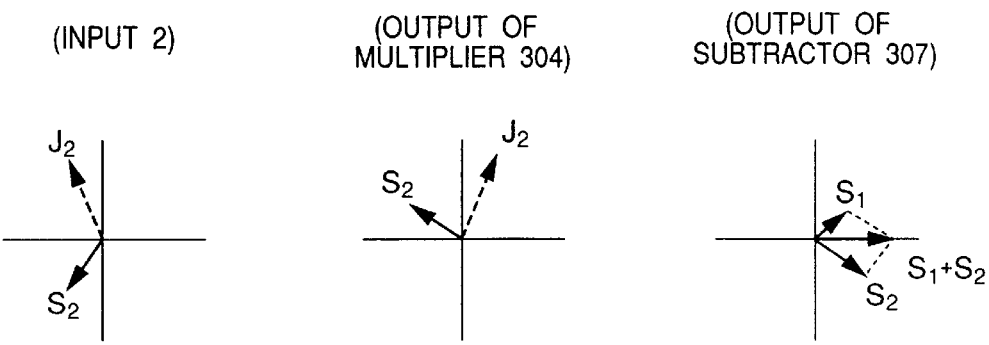
Figures 9G, 9H, 9I:
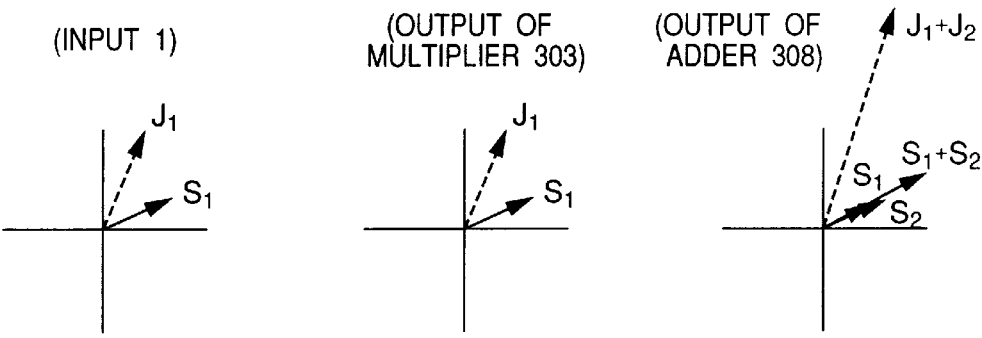
Figures 9J, 9K, 9L:
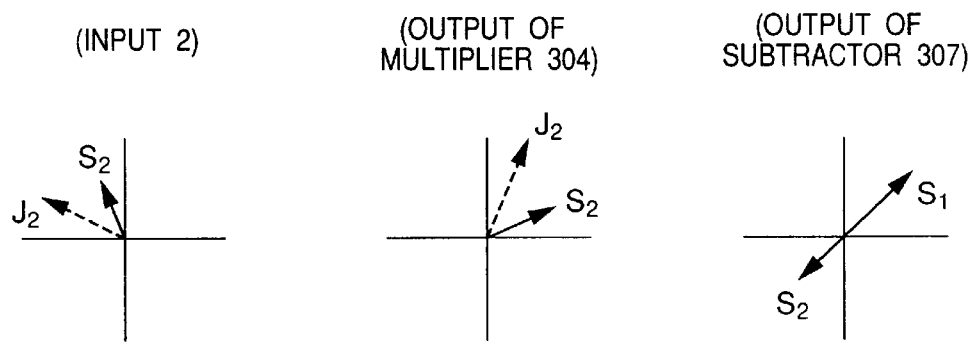

The arrangement of the present invention shown in FIG. 1 adds the automatic gain control amplifiers (AGC) 111 and 131, the envelope detectors 113 and 133, the constant modulus algorithm control circuits 114 and 134, and the complex multipliers 115 and 135 to the arrangement of the prior art shown in FIG. 7.

The present invention advantageously comprises means for multiplying a complex coefficient C on one branch of diversity transmitted signal, through use of the complex multipliers 115 and 135, so that a desired signal level has a predetermined value after PIAA combination at the receiving side. The means enables the simultaneous cancellation of interference signals with the PIAA and optimum combination of a desired signal.

Referring to FIG. 1, it is assumed that the first radio station performs transmission, and the second radio station performs receiving. When the receivers 127 and 128 of the second radio station are assumed to output received signals r1 and r2, r1 and r2 can be expressed by the following equation because the complex coefficient C is multiplied on one branch of the diversity transmitted signal.

$$r1 = h11 \cdot S + h21 \cdot C \cdot S + J1 \cdot J \quad (9)$$

$$r1 = h12 \cdot S + h22 \cdot C \cdot S + J2 \cdot J \quad (10)$$

Therefore, output y of the PIAA circuit 129 is:

$$y = \{W1(h11 + h21 \cdot C) - W2(h12 + h22 \cdot C)\} \cdot S + (W1 \cdot J1 - W2 \cdot J2) \cdot J \quad (11)$$

To cancel the interference signal J in the above equation, the PIAA circuit 129 correlates and calculates weight coefficients W1 and W2 given by equations (6) and (7) to cancel the interference signal. Thus, the PIAA circuit 129 provides an output:

$$y = \{W1(h11 + h21 \cdot C) - W2(h12 + h22 \cdot C)\} \cdot S \quad (12)$$

In contrast with the prior art, as clearly seen from the above equation (12), the present invention includes weight coefficient C which is multiplied at the transmission side. A condition for optimum combination of two branches with respect to a desired signal S in equation (12) is that the coefficient for the desired signal S becomes 1. This is equivalent to the fact that the main impulse response becomes 1 to establish the distortionless condition of Nyquist if the transmitter-link is considered as an impulse response. Therefore, there exists a weight coefficient $C_{OPT}$ which satisfies:

$$W1(h11 + h21 \cdot C) - W2(h12 + h22 \cdot C) = 1 \quad (13)$$

If the complex coefficient C is offset from the optimum solution $C_{OPT}$, the distortionless condition of Nyquist is also not satisfied. The worst case is that the left side of equation (13) is zero, instead of 1. This means that the desired signals of two branches cancel each other due to inverse-phase cancellation. The left side of equation (13) corresponds to the received signal level of desired signal in the output of the PIAA circuit 129, as clearly seen from equation (12).

The present invention detects the received signal level of the PIAA circuit 129 with the envelope detector 133 of the second radio station.

The received signal level information is fed back to the first radio station, thereby the complex coefficient C is controlled to the optimum value on the basis of the received signal level information.

Figure 2:
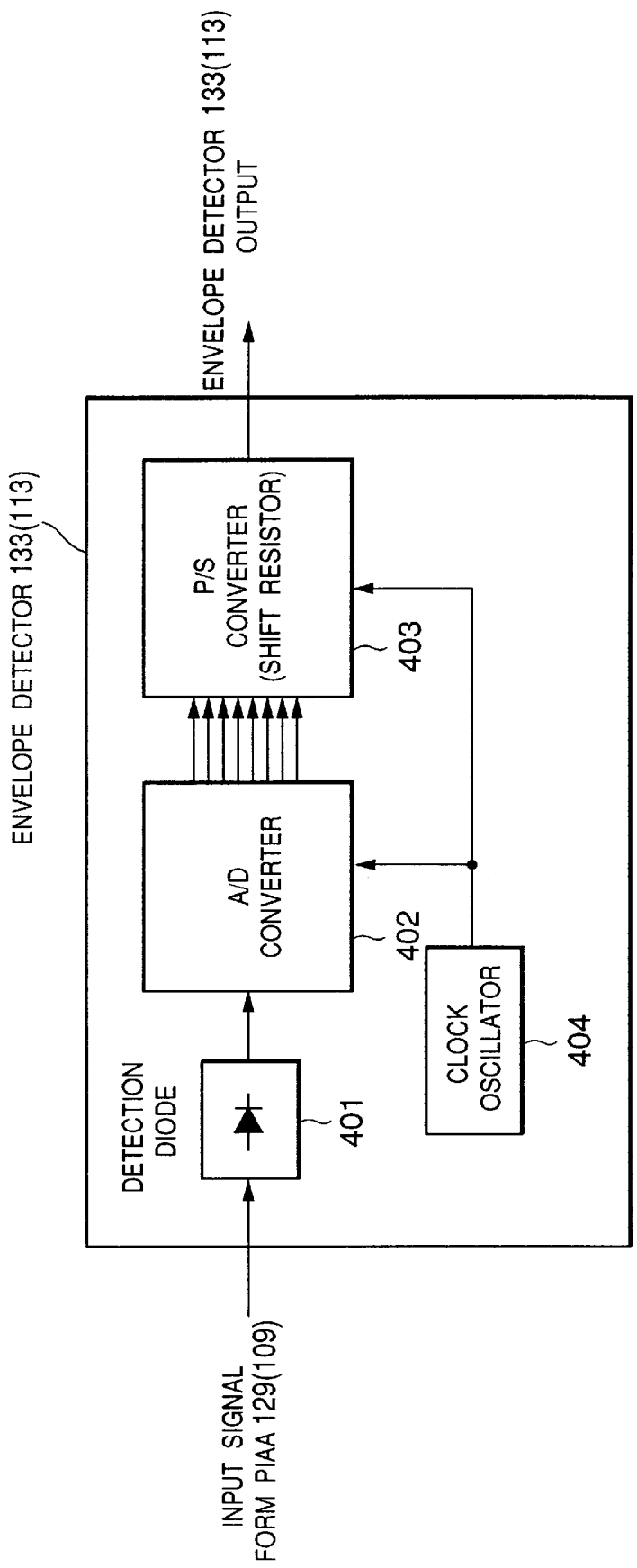
FIG. 2 is a block diagram of an envelope detector 133 (113) shown in FIG. 1.

That is, a received signal output from the PIAA circuit 129 is detected by the envelope detector 133. In FIG. 2, the envelope detector 133(113) consists of a detection diode 401 for detecting received signal level, an A/D converter 402 for converting the detected received signal level into parallel digital data, a P/S converter 403 for converting the parallel digital data into serial data and a clock oscillator 404 for generating timing of the A/D converter 402 and the P/S converter 404.

Referring FIG. 1, the received signal level information is input into the transmitting baseband circuit (TX BB) 121. The TX BB 121 time division multiplexes (TDM) the TX DATA with the received signal level information in order to send the received signal level information to the first radio station.

Figure 3:
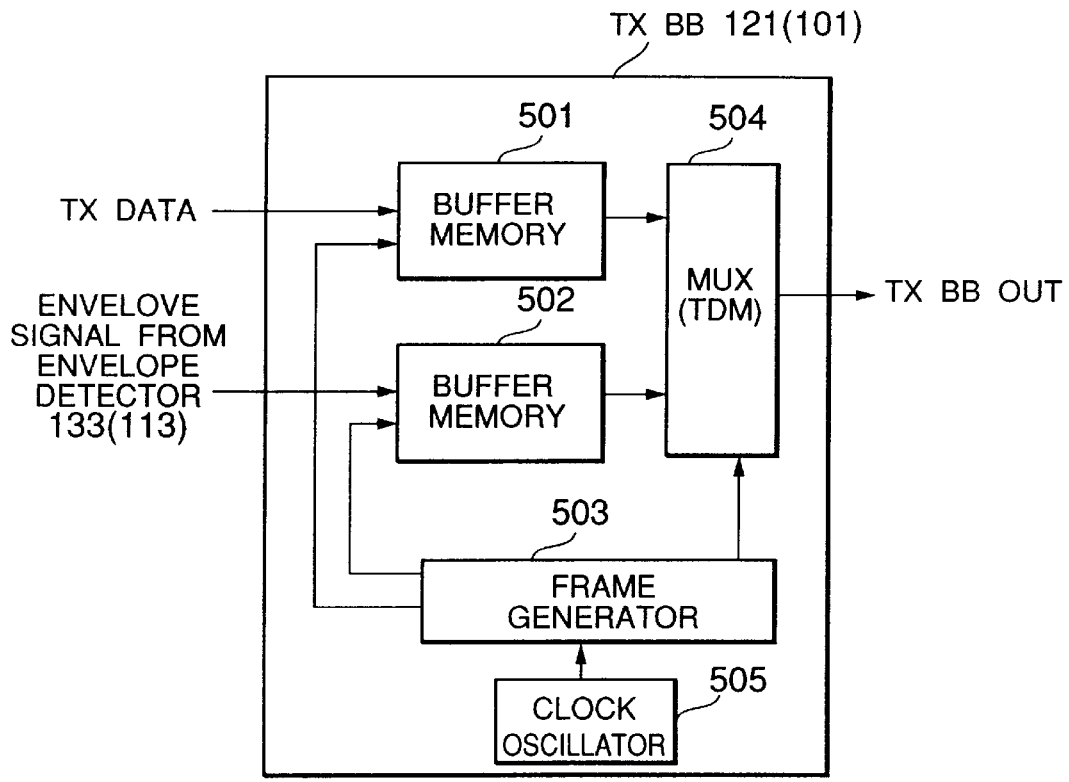
FIG. 3 is a block diagram of the TX BB 121(101) shown in FIG. 1.

In FIG. 3, the transmitting baseband circuit 121(101) consists of a buffer memory 501 for memorizing TX DATA, a buffer memory 502 for memorizing output of the envelope detector 133(113), a frame generator 503 for generating TX frame signals, a clock oscillator 505 for generating a reference clock of the TX frame signals and multiplier 504 for time division multiplexing the TX DATA with output of the envelope detector in common speed in frame format of the TX frame signals.

The received signal level information is time division multiplexed on the overhead section of the transmitted data series together with the frame synchronization signal or the like, and then transmitted to the first radio station from the second radio station.

Figure 4:
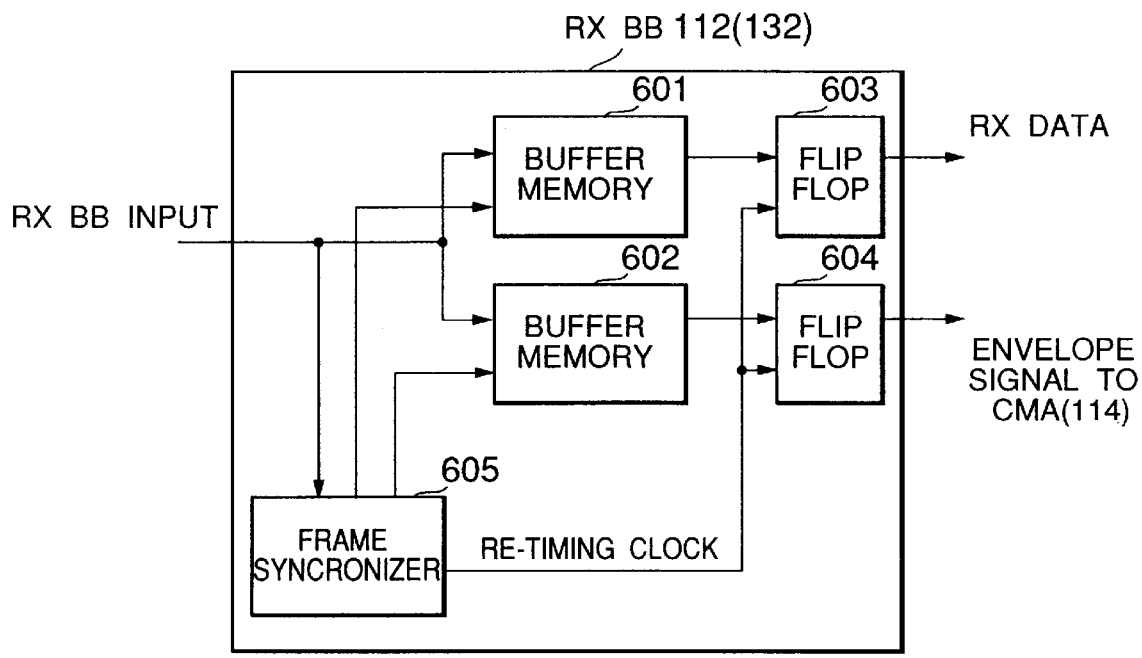
FIG. 4 is a block diagram of the RX BB 112 (132) shown in FIG. 1.

When the first radio station receives the signal, the first radio station performs frame synchronization, separation and extraction of the received signal level information at the received baseband circuit 112. In FIG. 4, the received baseband circuit 112(132) consists of a buffer memory 601 and 602 for memorizing received RX BB input signal and outputting RX DATA in a timing based on read clocks from a frame synchronizer 605 respectively, flip-flop 603 and 604 for outputting RX DATA and data signal for the CMA 114 on the basis of a re-timing clock respectively and a frame synchronizer 605 for establishing a receive frame synchronization and generating the read clocks and the re-timing clock.

The output of the RX BB 112 is input into the constant modulus algorithm control circuit (CMA) 114. The constant modulus algorithm control circuit 114(134) controls the complex coefficient C to be multiplied on the multiplier 115 adaptively so that the received signal level information of the second radio station becomes a desired constant value.

The method for controlling the constant modulus algorithm is proposed by Trihiller and Aggie in "A New Approach to Multipath Correction of Constant Modulus Signals," IEEE Transaction Aerospace Signal Processing, Vol. 31, April 1983, pp. 459–472. The constant envelope algorithm is quoted as follows:

When a signal input vector is assumed to be X, a weight coefficient vector W, an array combined output y is $$y = X^T W^* \tag{14}$$

Then, an performance function Q is defined as $$Q = ||y|^p - \sigma^p|^q \tag{15}$$

Then, the weight coefficient vector W is determined by the maximum gradient method or the like so that Q becomes the minimum. In equation (15), p and q are integers, and $\sigma$ is a desired modulus value. Here, if p is 2, $|y|^2$ corresponds to signal power of the array combined output, and $\sigma^2$ corresponds to a desired constant power.

The array output $y = X^T W^*$ defined here corresponds to the output of PIAA circuit 129 shown in FIG. 1. The output y is a combined output of desired signals of two branches after the interference signal is cancelled. If its value equals to the desired power $\sigma^2$, the performance function Q becomes zero. If the desired signals of two branches are inverse-phase combined in the PIAA circuit, the performance function Q has a power value of $\sigma^2$. Here, the weight coefficient vector W in equation (14) is not the weight coefficient of PIAA circuit in the present invention, but applied to the weight coefficient C at the transmission side shown in FIG. 1.

The output of the PIAA circuit 129 of FIG. 1 is expressed by equation (12). Here, W1 and W2 are the weight coefficients in the branches of the PIAA circuit 129, and C is the weight coefficient of the second branch at the transmission side. W1 and W2 are coefficients controlled only by the PIAA circuit 129, and do not depend on the weight coefficient C at the transmission side. W1 and W2 gradually time vary according to the multipath-fading or the like as in the propagation constants h11, h12, h21, and h22. Therefore, when control by the constant modulus algorithm is considered, if the time constant for the constant modulus algorithm control is established to be shorter than the multipath-fading variation, all but the weight coefficient C at the transmission side can be treated as constants.

Then, when equation (12) is rewritten considering only C as a variable, $$y = \{(W1h21 - W2h22) \cdot C + (W1h11 - W2h12) \cdot S \tag{16}$$

Here, when $$H2 = W1h21 - W2h22, \quad H1 = W1h11 - W2h12 \tag{17}$$

and the transmitted signal S is normalized to 1, then equation (16) is further:

$$y = H2 \cdot C + H1 \tag{18}$$

Since y is a complex number, its power is as follows:

$$|y|^2 = y^* y$$

$$= H2^* H2 C^* C + H1^* H2 C + H2^* H1 C + H1^* H1 \tag{19}$$

Here, * represents complex conjugate. Therefore, if q=1, the performance function Q is $$Q = |H2^* H2 C^* C + H1^* H2 C + H2^* H1 C + H1^* H1 - \sigma 2| \tag{20}$$

Figure 5:
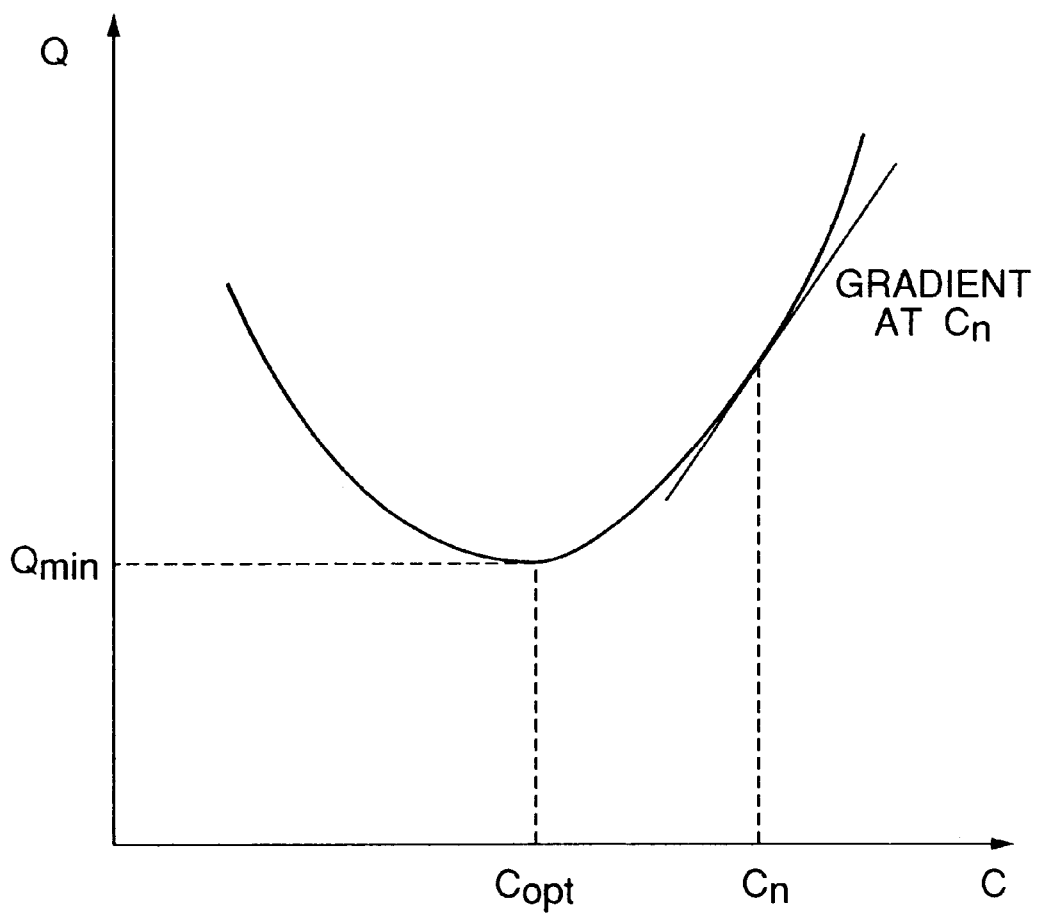
FIG. 5 shows relation between performance function Q and weight coefficient C.

The above equation (20) is in a quadratic form with C as a variable, and constitutes a quadratic curve convex downward shown in FIG. 5. Therefore, Q can have the minimum value at $C_{OPT}$ on a plane of real and imaginary number axes of the complex weight coefficient $C = C_R + jC_I$.

Since the $C_{OPT}$ is the optimum value, if the complex coefficient value $C_{OPT}$ is set in the complex multiplier 115, it is possible to maintain the output of PIAA circuit 129 of the second radio station which is the receiving side at the desired power value $\sigma^2$.

Figure 6:
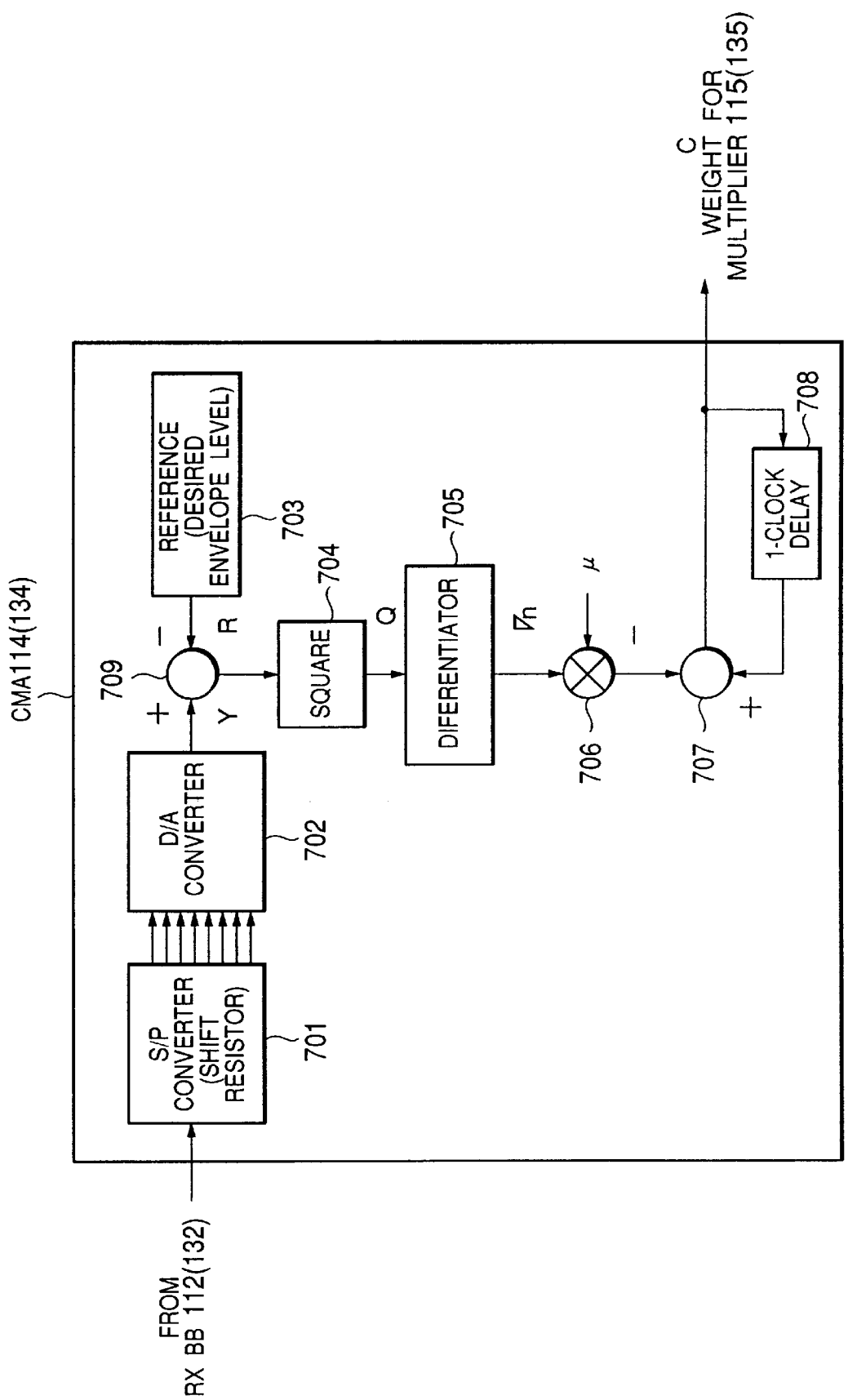
FIG. 6 is a block diagram of CMA 134(114) shown in FIG. 1.

In FIG. 6, the CMA 114(134) comprises a serial/parallel converter 701 for converting serial data from the RX BB 112(132) into parallel digital data, a D/A converter 702 for converting the parallel digital data into analog voltage (y), a subtractor 709 for subtracting an output (R) of a reference 703 from an output (y) of the D/A converter 702, the reference 703 for generating desired enveloped level, a square circuit 704 for squaring an equation (y−R), a differentiator 705 for differentiating between an output of the square circuit 704 and the weight coefficient C, a multiplier 706 for multiplying output of the differentiator 705 by a coefficient $\mu$, a subtractor 707 for subtracting an output of the multiplier 706 from one clock-delayed weight coefficient C and a one-clock delay circuit 708 from delaying the weight coefficient by one clock.

In FIG. 6, a differentiate coefficient Vn (a gradient at Cn) at the output of the differentiator 705 is expressed by following equation.

$$\nabla n = \partial Q / \partial Cn \quad (21)$$

Here, coefficient Cn is amended by following equation $$Cn+1 = Cn - \mu \nabla n \quad (22)$$

Coefficient Cn is amended step by step on the basis of the gradient at Cn. Finally, C is converged to the zero-gradient situation where C is the Copt.

In the above explanation, two transmitters (two-branching) and two receivers (two-diversity) are installed at each station. However, the present invention is not limited in this configuration. That is, the PIAA can operate appropriately in case of receiving more than 3 inputs. Therefore, this present invention can apply to a microwave communication system having multi-transmitters (multi-branchings) and multi-receivers (multi-diversities).

With the above operation, it becomes possible to prevent the desired signal from being cancelled by each other in inverse-phase, so that the optimum diversity combination can be attained for the desired signals with PIAA simultaneously with elimination of the interference signals.

As described above, since, according to the present invention, the receiving side feeds back the receiving information of desired signal to the transmission side, and the transmission side is provided with the optimum diversity combination for the desired signal suffered from fading at the transmission side, it is possible to prevent inverse-phase cancellation of the desired signals which may occur in cancelling the interference signal with PIAA, and to receive the desired signals.

What is claimed is:

1. An apparatus for interference cancellation in a microwave communication system comprising:
   first station transmitters for branching a modulated signal into a plurality of branched modulated signals and transmitting said plurality of branched modulated signals to a second station;
   second station diversity-receivers for diversity-receiving said plurality of modulated signals;
   a second station interference canceler for cancelling an interference signal from received signals of said diversity-receivers through a power inversion adaptive array circuit; and
   a control means for feeding back received signal level information from said power inversion adaptive array circuit output to said first station and controlling a complex coefficient multiplier at said first station transmitter to an optimum value based on said received signal level information.

2. The apparatus for interference cancellation of claim 1, wherein said control means comprises:
   a second station envelope detector for envelope detecting the output of said power inversion adaptive array circuit to find said received signal level information;
   a feed-back circuit for feeding back said found received signal level information to said first station;
   a first station detector for detecting the received signal level information fed back from said second station;
   a first station multiplier for multiplying the complex coefficient times one of said branched modulated signals; and
   a controller for controlling the value of the complex coefficient based on said detected received signal level information so that the received signal level at said first station takes the optimum value.

3. The apparatus for interference cancellation of claim 1, wherein said transmitted data is time division multiplexed with an overhead signal.

4. The apparatus for interference cancellation of claim 3, wherein said received signal level information is fed back to the transmission side as a part of said overhead signal.

5. The apparatus for interference cancellation of claim 2, wherein said second station envelope detector comprises;
   analog-digital converter for converting said envelope detected signal into digital data.

6. The apparatus for interference cancellation of claim 1, wherein said control means is controlled according to a constant modulus adaptive algorithm.

7. An apparatus for interference cancellation in a microwave communication system comprising:
   a transmitting baseband circuit for time division multiplexing an overhead signal including a frame synchronization signal on transmitted data;
   a modulator for modulating said time division multiplexed signal;
   a brancher for branching said modulated output into a plurality of modulated signals;
   a complex multiplier for multiplying a complex coefficient on one of said plurality of modulated signals;
   transmitters for transmission frequency converting and amplifying outputs of said modulator and an output of said complex multiplier as transmitted signals;
   first antennae for being input with outputs of said transmitters and transmitting said transmitted signals in vertical or horizontal polarization;
   second antennae for receiving said transmitted signals as received signals;
   receivers for low noise amplifying and received frequency converting said received signals;
   a power inversion adaptive array circuit being input with said received signals for interference cancellation;
   an envelope detector for envelope detecting the output of said PIAA circuit and outputting received signal level information;
   a demodulator for demodulating said output of said power inversion adaptive array circuit as demodulated received data;
   a receiving base band circuit for frame synchronizing said demodulated received data and extracting and separating said received signal level information; and a constant modulus algorithm control circuit for finding a complex coefficient to be multiplied on one of said plurality of modulated signals so that said extracted and separated received signal level has a desired constant value.

8. The apparatus for interference cancellation as claimed in claim 7, further comprising:

first input means for having said received signal level information output from said envelope detector circuit input into said transmission baseband circuit;

transmission means for transmitting said received signal level information as a part of said overhead signal; and second input means for having the output of said constant modulus algorithm control circuit input into said complex multiplier.

9. A method for interference cancellation in a microwave communication system, said method comprising:

at a first station, branching a modulated signal modulated by transmitted data into a plurality of branched modulated signals and transmitting said plurality of branched modulated signals to a second station;

at said second station, diversity-receiving said plurality of modulated signals with a diversity receiver;

interference cancelling an interference signal from received signals of said diversity receiver through a power inversion adaptive array circuit; and feeding back received signal level information to said first station and controlling a complex coefficient multiplier at a transmitter circuit of said first station to an optimum value based on said received signal level information.

10. The method for interference cancellation as claimed in claim 9, further comprising the step of multiplying the complex coefficient times one of said branched modulated signals;

envelope detecting the output of said power inversion adaptive array circuit to find said received signal level information;

feeding back said found received signal level information to the first station;

detecting the received signal level information fed back from the second station; and controlling the value of the complex coefficient based on said detected received signal level information so that the received signal level at said first station takes the optimum value.

* * * * *